(12) United States Patent
Ibrahim et al.

(10) Patent No.: US 11,176,339 B2
(45) Date of Patent: Nov. 16, 2021

(54) V2X GATED ENTRY MANAGEMENT

(71) Applicant: FORD GLOBAL TECHNOLOGIES, LLC, Dearborn, MI (US)

(72) Inventors: Samer Ibrahim, Dearborn, MI (US); Jovan Milivoje Zagajac, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 208 days.

(21) Appl. No.: 16/662,946

(22) Filed: Oct. 24, 2019

(65) Prior Publication Data
US 2021/0124885 A1    Apr. 29, 2021

(51) Int. Cl.
*H04W 4/44* (2018.01)
*G06K 7/10* (2006.01)
*G07C 9/00* (2020.01)
*H04W 4/06* (2009.01)

(52) U.S. Cl.
CPC ..... *G06K 7/10722* (2013.01); *G07C 9/00896* (2013.01); *H04W 4/44* (2018.02); *H04W 4/06* (2013.01)

(58) Field of Classification Search
CPC .. G06K 7/10722; H04W 4/44; G07C 9/00896
USPC ....................................... 235/462.13, 462.41
See application file for complete search history.

(56) References Cited

U.S. PATENT DOCUMENTS

| | | | |
|---|---|---|---|
| 6,853,709 B1* | 2/2005 | Sakadjian | H04M 11/025 379/102.01 |
| 9,117,369 B2 | 8/2015 | Nagy | |
| 10,134,210 B1 | 11/2018 | Gravelle et al. | |
| 2003/0029089 A1* | 2/2003 | Wenzl | E01F 13/06 49/49 |
| 2007/0096872 A1* | 5/2007 | Nguyen | G07C 9/00182 340/5.61 |
| 2010/0128931 A1* | 5/2010 | Bongard | G07B 15/00 382/105 |
| 2014/0213176 A1* | 7/2014 | Mendelson | G01S 5/04 455/39 |
| 2017/0103265 A1* | 4/2017 | Channah | G06K 9/00771 |
| 2017/0103487 A1* | 4/2017 | Channah | G06F 16/5854 |

FOREIGN PATENT DOCUMENTS

CN    105137802 A    12/2015
JP    2006321396 A    11/2006

* cited by examiner

*Primary Examiner* — Paultep Savusdiphol
(74) *Attorney, Agent, or Firm* — Michael J. Spenner; Brooks Kushman P.C.

(57) ABSTRACT

A request is received, from an onboard unit of a vehicle to a roadside unit in control of a gate protecting a gated area, for access rights to the gated area. Responsive to determining that the vehicle is authorized to enter, vehicle localization is performed to confirm that the vehicle has an unobstructed path to the gate. The vehicle localization is performed using one or more approaches. Responsive to confirming that the vehicle has an unobstructed path to the gate, direct the gate to open to allow the vehicle to proceed.

18 Claims, 9 Drawing Sheets

V2X GATED ENTRY MANAGEMENT

TECHNICAL FIELD

The present disclosure relates to aspects of vehicle-to-everything gated entry management.

BACKGROUND

Vehicle-to-everything communication technology (or V2X) allows vehicles to communicate and exchange information with other vehicles, infrastructure, pedestrians, networks, and other devices. Vehicle to Infrastructure communications (or V2I) enables applications that leverage this capability to facilitate or speed up communication and transactions between vehicles and infrastructure.

SUMMARY

In one or more illustrative examples, a system for vehicle gated entry management, includes a roadside unit, in control of a gate protecting a gated area, the roadside unit programmed to receive a request, from an onboard unit of a vehicle, for access rights to the gated area, responsive to determining that the vehicle is authorized to enter, perform vehicle localization to confirm that the vehicle has an unobstructed path to the gate, and responsive to confirming that the vehicle has an unobstructed path to the gate, direct the gate to open to allow the vehicle to proceed.

In one or more illustrative examples, a vehicle configured for gated entry includes an onboard unit configured for wireless communication with a roadside unit, the onboard unit programmed to send a request, to a roadside unit in communication with a gate protecting a gated area, for access rights to the gated area, responsive to receiving an indication that the vehicle is authorized to enter the gated area, perform vehicle localization to confirm that the vehicle has an unobstructed path to the gate, and responsive to confirming that the vehicle has an unobstructed path to the gate, direct the gate to open to allow the vehicle to proceed.

In one or more illustrative examples, a method for vehicle gated entry management, includes receiving a request, from an onboard unit of a vehicle to a roadside unit in control of a gate protecting a gated area, for access rights to the gated area; responsive to determining that the vehicle is authorized to enter, performing vehicle localization to confirm that the vehicle has an unobstructed path to the gate; and responsive to confirming that the vehicle has an unobstructed path to the gate, direct the gate to open to allow the vehicle to proceed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Gated entry situations typically involve strictly controlled entrances for pedestrians, bicycles, and automobiles, and are often characterized by a closed perimeter of walls and fences. Some examples of gated entry situations are gated parking lots, gated communities, police stations, and state parks. Gated entry situations may leverage V2I technology to seamlessly allow vehicles with proper authorization or access rights to enter while preventing unauthorized vehicles from entering.

Figure 1:
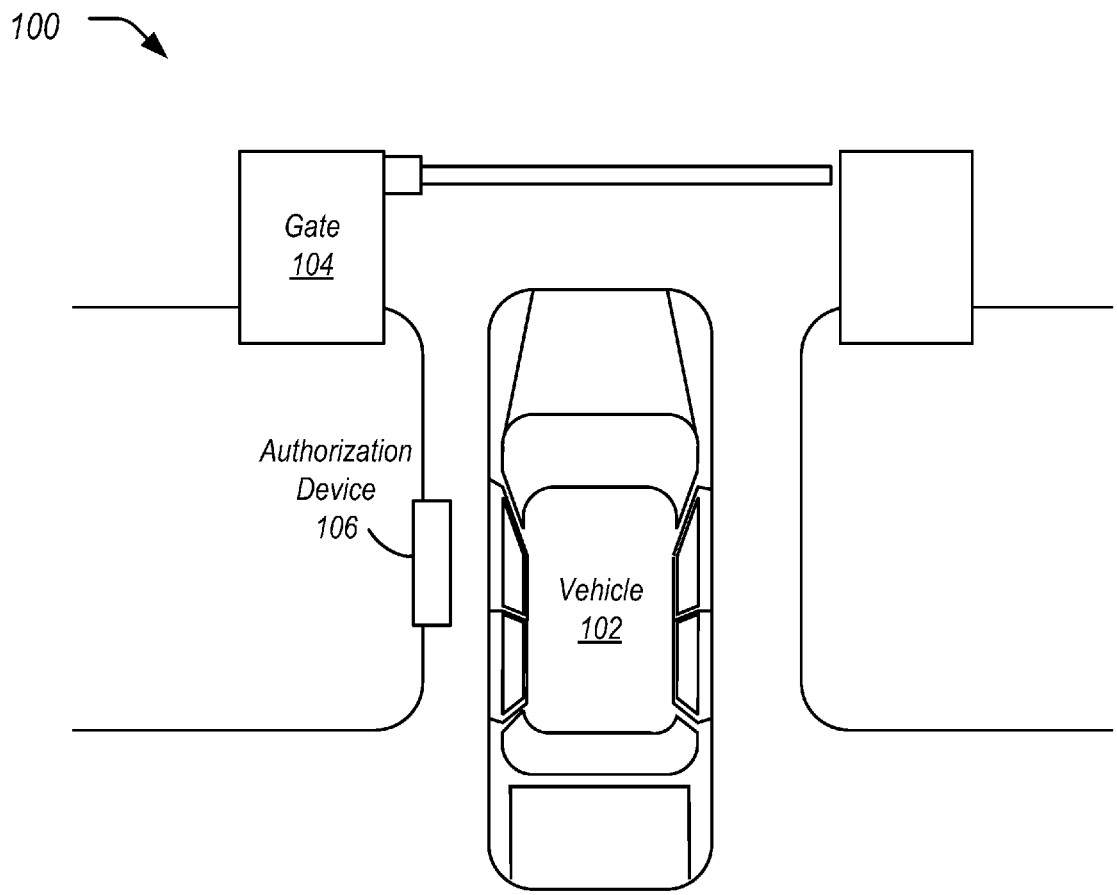
FIG. 1 illustrates an example gated entry system.

FIG. 1 illustrates an example gated entry system 100. As shown, the system 100 includes a vehicle 102 attempting to enter through a gate 104, where the vehicle 102 is within proximity to an authorization device 106. In the gated entry system 100, a user at close range may handle communication between the vehicle 102 and the infrastructure (e.g., the gate 104) via the authorization device 106. In one example, the user may pull the vehicle 102 up to the gate 104, and use the authorization device 106 to make a payment, get a parking ticket, press a button, or provide identification or information that gives the user access to the gated area.

Gaining access to an area beyond the gate 104 may be based on one of two categories of system: prior authorization systems, and no prior authorization systems. In the prior authorization category, a user of the vehicle 102 may be provided with prior authorization to access the area bounded by the gate 104, but the user has to pull the vehicle 102 to the gate 104 to present identification. In the no prior authorization category, the user gains authorization to access the area protected by the gate 104 by making a payment or collecting a card to make a payment later (an example is a parking structure where the user collects a ticket upon entry and presents the same ticket while exiting to pay).

With an approach such as shown in FIG. 1, the mechanism for gaining access and entry inherently confirms that the authorized vehicle is the one at the gate 104. For example, a user pulling a vehicle 102 into a parking garage positions the vehicle 102 at the gate and presses a button, presents identification, or makes a payment. This ensures that the user is taking action to let the vehicle 102 in, and there is no free space between the authorized vehicle 102 and the physical gate 104 that could allow another vehicle 102 to enter. Since the user has to take action, this will also ensure that the user will only take action when it is his or her turn at the gate 104.

Figure 2:
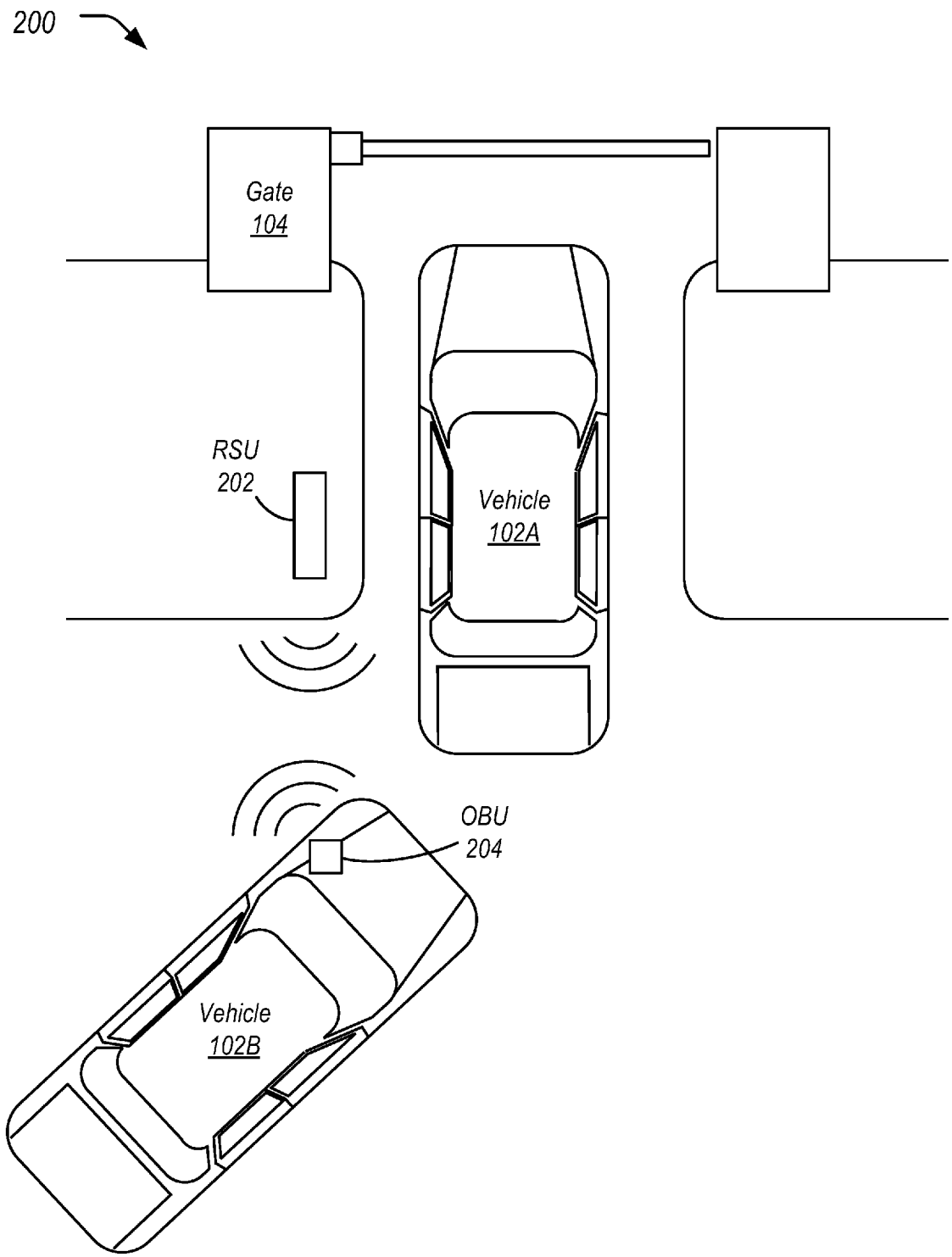
FIG. 2 illustrates an alternate example gated entry system using a wireless authorization device.

FIG. 2 illustrates an alternate example gated entry system 200 using a wireless roadside unit (RSU) 202. As shown, a first vehicle 102A is at the gate 104, while a second vehicle 102B is queued behind the first vehicle 102A. The system 200 also includes the RSU 202, which may be used to allow the vehicles 102A and 102B (collectively 102) to wirelessly communicate with the gate 104. The RSU 202 may be equipped with V2X communication functionality (e.g., DSRC, C-V2X, etc.), and the vehicle 102B may include an onboard unit (OBU) 204 also equipped with V2X communication functionality. In an example, the RSU 202 may be referred to as an V2I authorization device. These devices may be configured to automatically communicate authorization information with one another, avoiding unnecessary user interaction. Various proposed V2X gated entry systems describe authentication or payment linked to the vehicle 102, where when the vehicle 102 approaches a gate, an exchange of information occurs at very high speed without involving the user and the gate 104 opens automatically.

As shown in the system 200, the RSU 202 may have a longer range than the authorization device 106. This allows the RSU 202 to cover a broader area. When a vehicle 102 approaches the gate 104, the vehicle 120 may perform communication with the RSU 202 from a longer range and have the infrastructure ready to open the gate 104 when the vehicle 102 reaches close proximity (e.g., based on exchanged GPS information) so the vehicle 102 does not have to stop at the gate 104 at all. However, the infrastructure may be unable to verify that the vehicle 102 at the gate 104 is actually the vehicle 102 that authorized the entry. For instance, to use the example of the system 200, the vehicle 102B may authorize entry, but the vehicle 102A may reach the gate 104 first. This may be possible to occur if the vehicle 102A is not equipped with V2X technology, and therefore has not communicated at all with the RSU 202. The unauthorized vehicle 102 could then see the gate 104 opening and proceed through the gate 104 without having the proper authorization.

A similar scenario occurs when the vehicle 102 attempts to enter an area with multiple gates 104 that could lead to the same or different sections inside the gated area. In one example, an airport parking lot may include multiple gates 104 to allow more vehicles 102 to enter. Those gates 104 could also lead to different sections of the parking, such as short-term vs long-term parking. In some examples, the set of gates 104 may be operated by a single RSU 202 communicating with multiple vehicles 102. If a specific vehicle 102 requests access to a specific gate 104 at a specific lane, this information should be reliably communicated to the RSU 202 (i) to ensure the proper gate 104 is opened to this vehicle 102, and (ii) to record what gate 104 the vehicle 102 gained entry through as this might incur a different parking fee.

Moreover, inside a structure with low global navigation satellite system (GNSS) reception or no GNSS reception, GNSS may not be reliable for localizing the vehicle 102. Moreover, even with GNSS, identifying the location of the vehicle 102 will not be enough, as the RSU 202 may further have a stored map for the location to be able to localize the vehicle 102 correctly within this map.

Figure 3:
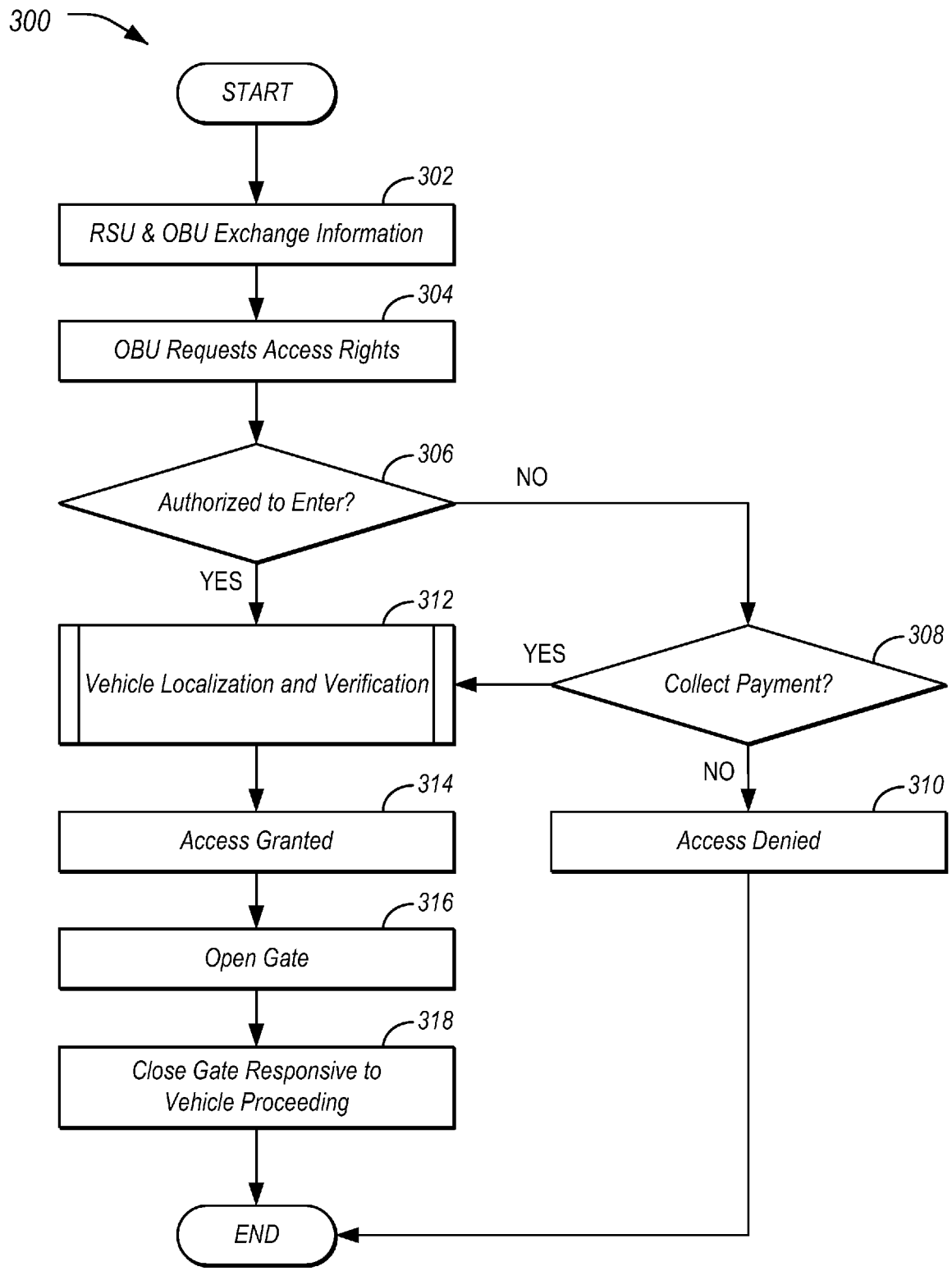
FIG. 3 illustrates an example process for the system, defining a process of authorizing vehicles with verification.

FIG. 3 illustrates an example process 300 for the system 200, defining a process of authorizing vehicles 102 with verification. As described in further detail, the process 300 allows the RSU 202 to open the gate 104 to the appropriate vehicle 102 at the appropriate time. The process 300 may utilize one or more of various methods of verification, as described in detail herein.

At operation 302, the RSU 202 and the OBU 204 of the vehicle 102 exchange information. In an example, this could be initiated by the OBU 204 based on the vehicle 102 entering a predefined geofence or responsive to a user action. Or, the exchange may be initiated by the RSU 202, as the RSU 202 may be broadcasting its location and its capabilities and functionality. This broadcasting may be done, for example, to let vehicles 102 know that a parking structure is open and in service with a specific number of empty parking spots, that the RSU 202 is equipped with V2X technology, and that the RSU 202 is able to handle transactions over V2X.

The OBU 204 requests access rights at 304. For example, responsive to the OBU 204 and the RSU 202 establishing communication, the OBU 204 may show interest in accessing the area behind the gate 104. The request may be initiated automatically (e.g., based on GNSS location and the vehicle 102 driving toward the gate), or the request may be initiated by a prior user preference or by driver indication through the human-machine interface (HMI) of the vehicle 102.

At operation 306, the RSU 202 determines whether the OBU 204 has authorization to enter. In an example, the authorization may be determined by identifying access rights for the vehicle 102 based on exchanged data, such as an identifier of the vehicle 102 that is authorized to enter, or an identifier of a vehicle occupant who is authorized to enter. If the vehicle 102 is authorized to enter, control passes to operation 310. If not, then control passes to operation 308.

The RSU 202 determines, at 308, whether payment is collected from the vehicle 102. In an example, to gain authorization, the OBU 204 of the vehicle 102 may exchange information related to securing payment with the RSU 202. This information may include, as some examples, an account number, a user name, a signature, and/or a user biometric. If the vehicle 102 is authorized to enter, control passes to operation 312. If not, then control passes to operation 310.

At 310, the RSU 202 denies the vehicle 102 access. In an example, the RSU 202 may communicate a request denied message to the vehicle 102. The denial may, accordingly, inform the vehicle 102 and/or user that permission is denied and the vehicle 102 is unable to proceed through the gate 104. After operation 310, the process 300 ends.

At operation 312, the RSU 202 and OBU 204 perform vehicle localization and verification. In general, this operation allows the RSU 202 and gate 104 to allocate the vehicle 102 by determining exactly which gate 104 the vehicle 102 is approaching or in which lane the vehicle 102 is located. Also the RSU 202 and gate 104 may confirm that the path is clear between the vehicle 102 and the gate 104 and that the vehicle 102 can proceed through the gate 104 without obstruction. There are multiple methods that could be used separately or combined to go through these operations. Aspects of these methods of vehicle localization and verification are described in detail with respect to FIGS. 4-8.

At 314, the RSU 202 grants access to the vehicle 102. In an example, the RSU 202 may communicate an acknowledgment to the vehicle 102. The acknowledgement may, accordingly, inform the vehicle 102 and/or user that permission is granted and the vehicle 102 should be able to proceed through the gate 104. At operation 316, the RSU 202 opens the gate 104. At operation 318, the gate 104 closes responsive to the vehicle 102 proceeding through the gate 104. After operation 318, the process 300 ends.

Figure 4:
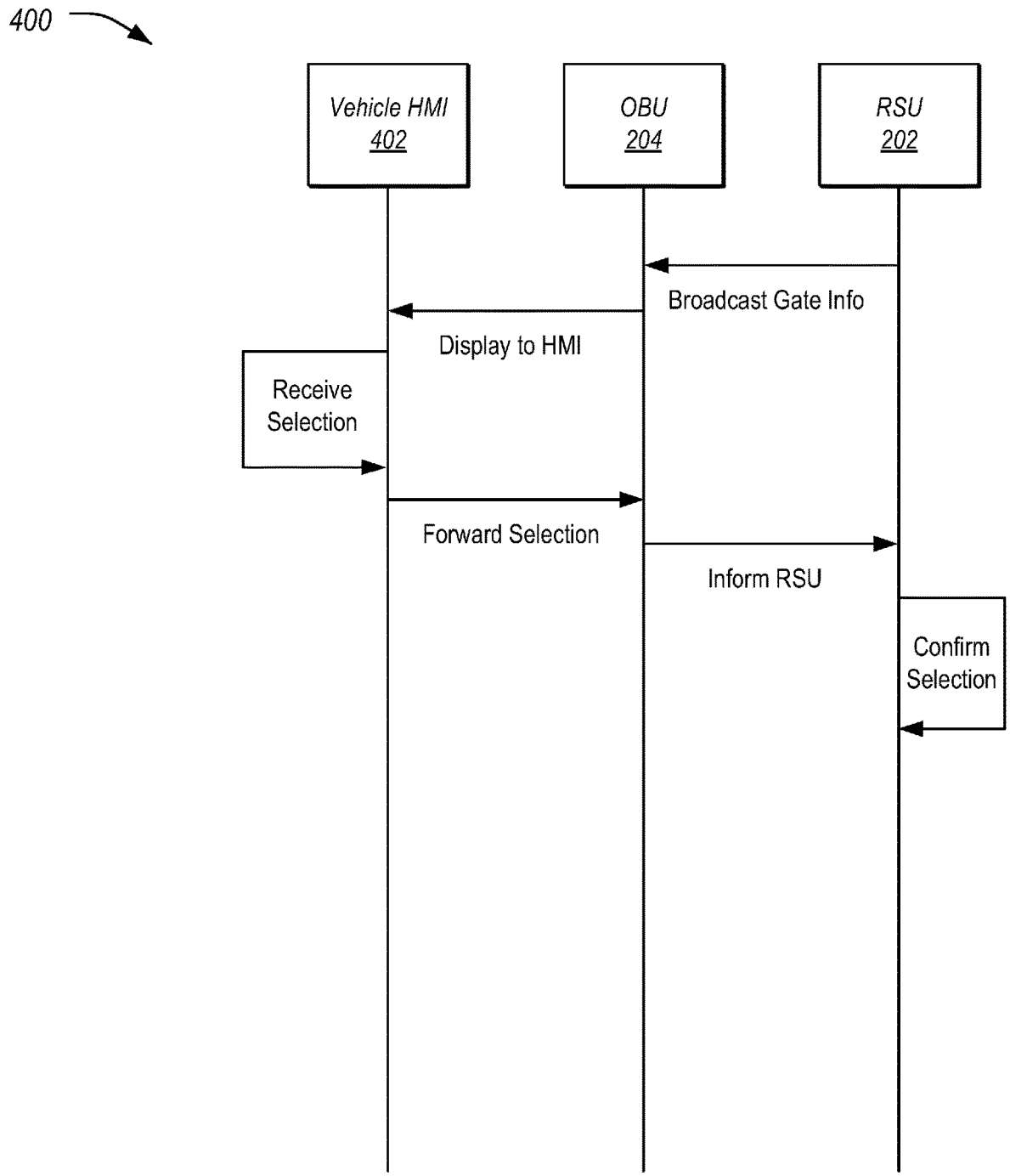
FIG. 4 illustrates an example dataflow for vehicle localization and verification utilizing user input.

FIG. 4 illustrates an example dataflow 400 for vehicle 102 localization and verification utilizing user input. In an example, the approach may request action from the driver. This approach may be used separately, or as a backup option for any of the other methods for vehicle 102 localization and verification discussed herein.

As shown, the RSU 202 broadcasts information regarding the gate 104. The information regarding the gate 104 may include a name of the gate 104, a location of the gate 104, and/or other information that may be used to identify the gate 104. The vehicle 102 receives this information via the OBU 204 of the vehicle 102 and displays a notification to the user of the vehicle 102 of the proximity to the gate 104 via a vehicle HMI 402. In an example, the vehicle HMI 402 includes a screen of the vehicle 102. In another example, the vehicle HMI 402 additionally or alternately includes audio prompting of the proximity to the gate 104. The HMI 402 may additionally display a list or other representation of available gates 104 or entry points to the gated area. The vehicle HMI 402 may receive a selection of a gate 104 to be entered by the vehicle 102 or in other examples with a single gate 104, an indication that the vehicle 102 intends to enter. The vehicle HMI 402 forwards this selection input to the vehicle 102, and the OBU 204 of the vehicle 102 informs the RSU 202. Moreover, the user may wait until it is his or her turn to go through the gate 104 and may request via the vehicle HMI 402 for the gate 104 to open, e.g., by pressing a button of the vehicle HMI 402 or speaking a command or taking another a similar action. The RSU 202 may, accordingly, confirm the selection.

Figure 5:
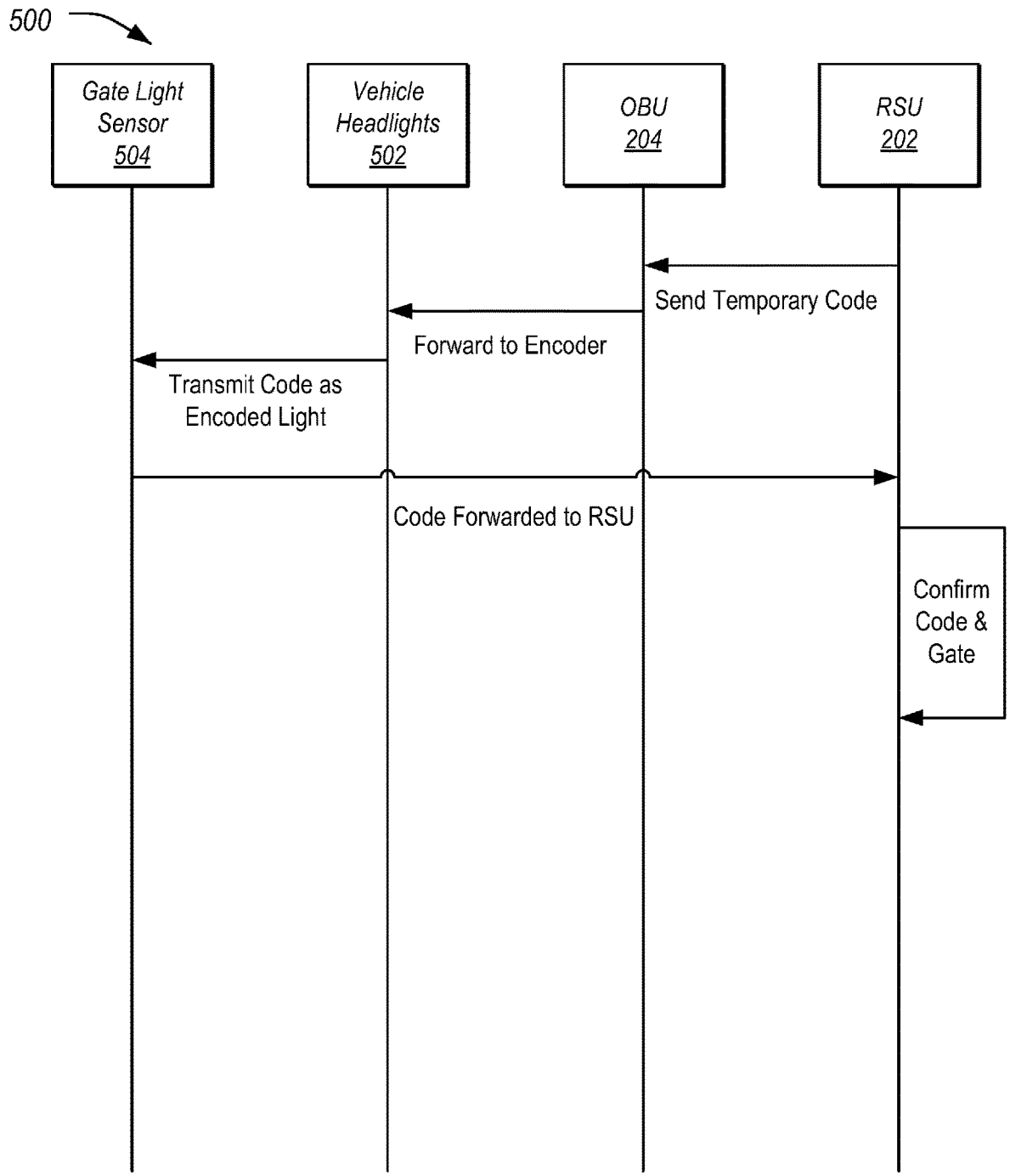
FIG. 5 illustrates an example dataflow for vehicle localization and verification utilizing light encoding.

FIG. 5 illustrates an example dataflow 500 for vehicle 102 localization and verification utilizing light encoding. As shown, the RSU 202 may share a temporary one-time code with the OBU 204 of the vehicle 102. The OBU 204 may receive this code and is configured to encode this code via LED encoding through the vehicle headlights 502. In addition, the RSU 202 may be connected to a LED light decoder in proximity to the gate 104. The gate light sensor 504 may detect the LED encoding emitted by the vehicle headlights 502 and forward the code back to the RSU 202. The RSU 202 may read the encoded code and confirm that the vehicle 102 receiving the code is present. This allows the RSU 202 to confirm that there is no obstruction between the vehicle 102 and the gate 104 and the authorized vehicle 102 is coming toward the proper gate 104.

Figure 6:
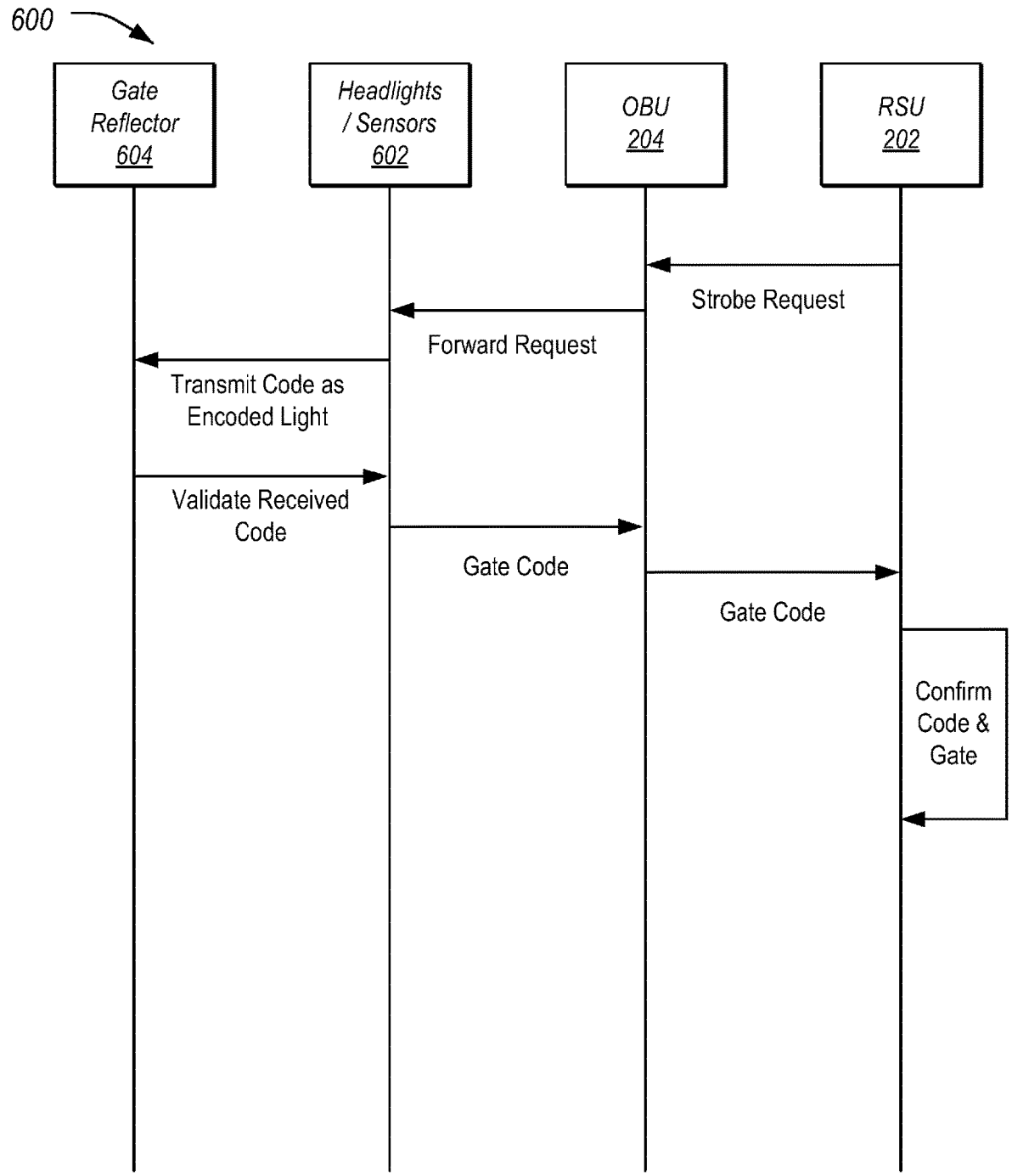
FIG. 6 illustrates an example dataflow for vehicle localization and verification utilizing a gate reflector.

FIG. 6 illustrates an example dataflow 600 for vehicle 102 localization and verification utilizing a gate reflector 604. As shown, the RSU 202 may request the OBU 204 of the vehicle 102 to send a basic light strobe. The OBU 204 may be configured to forward this request to the headlights 602 (e.g., through the LED headlights) of the vehicle 102. The gate 104 may be equipped with the gate reflector 604, which may be, in one example, reflective tape with an encoding to identify the gate 104 number. This encoding may be, for example, a pattern of reflective and unreflective portions that is unique for each different gate 104. The vehicle 102 headlights 602 may be equipped with a light sensor that reads the reflected code. The OBU 204 may communicate this reflected code back to the RSU 202. The RSU 202 may utilize the received information to confirm the gate 104 that the vehicle 102 is facing, is without obstruction. For instance, if the entire code sent to the OBU 204 is received back, then the RSU 202 may confirm the proximity of the vehicle 102 to the gate 104. As a variation of this approach, a camera of the vehicle 102 may be used to read the reflective tape encoding.

Figure 7:
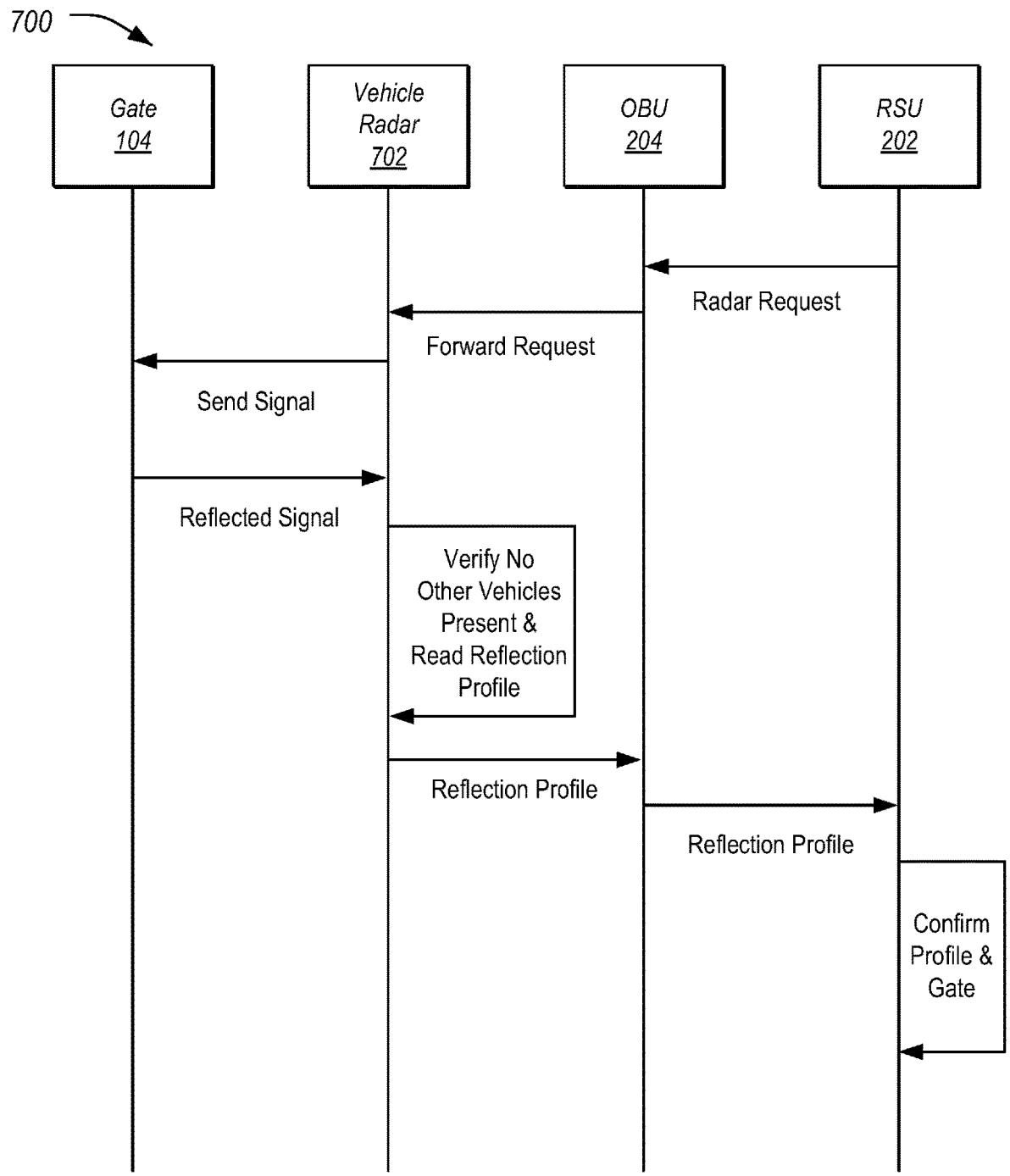
FIG. 7 illustrates an example dataflow for vehicle localization and verification utilizing radar.

FIG. 7 illustrates an example dataflow 700 for vehicle 102 localization and verification utilizing radar. As shown, the RSU 202 may request the OBU 204 of the vehicle 102 to send a radar signal toward the gate 104. The vehicle 102 may be equipped with radar 702 (e.g., for use in obstacle detection, driver assistance, or autonomous driving functionality), and may use the radar 702 to send a signal in the direction of the gate 104. The radar 702 may receive a reflected signal back from the gate 104 and may verify whether there is an obstruction between the vehicle 102 and the gate 104. The OBU 204 may receive the radar echo profile from the radar 702 and may send the reflection profile to the RSU 202. The RSU 202 may receive the profile and may compare the echo profile with known good profiles to ensure there is no obstruction between the vehicle 102 and the gate 104. Moreover, the RSU 202 may be able to use the radar echo profile to identify the gate 104 the vehicle 102 is facing, as different gates 104 may be designed to have different echo profiles.

Figure 8:
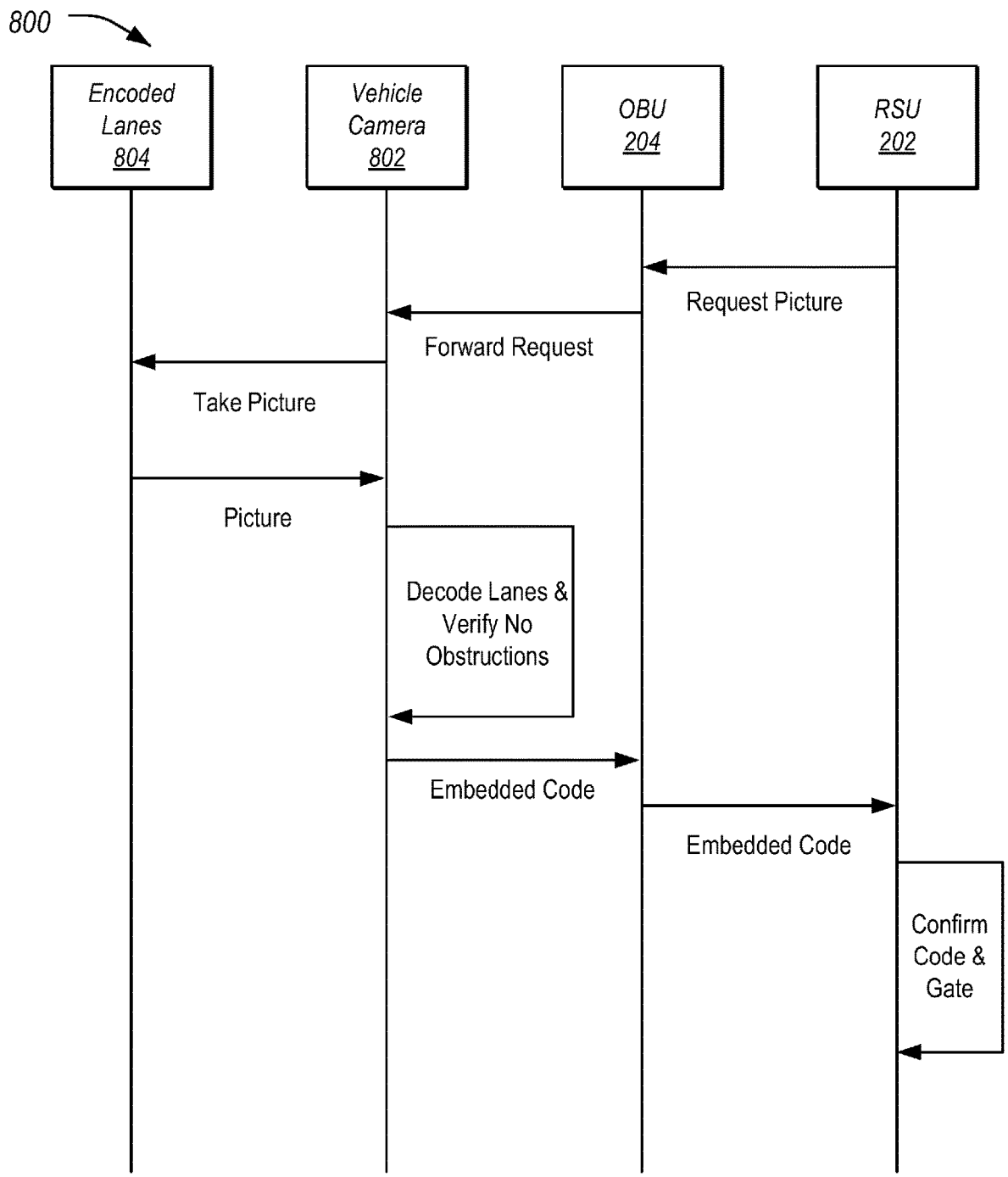
FIG. 8 illustrates an example dataflow for vehicle localization and verification utilizing encoded lanes.

FIG. 8 illustrates an example dataflow 800 for vehicle 102 localization and verification utilizing encoded lanes 804. In this example, the vehicle 102 may be equipped with vehicle cameras 802, such as side-view cameras, for lane-keeping assistance feature. The RSU 202 may request information from these cameras 802 via the OBU 204. The request may be forwarded from the OBU 204 to the vehicle cameras 80, which may take pictures of the roadway, which may include encoded lanes 804. The encoded lanes 804 may be embedded code in lane markers on one or both sides of the pathway being traversed by the vehicle 102 to the gate 104. These codes may be unique to the different gates 104, to allow the gates 104 to be differentiated. Images of these markers may be decoded to ensure that there are no obstructions between the vehicle 102 and the gate 104. In some examples, this decoding may be performed by the vehicle cameras 802, while in other examples this decoding may be performed by the OBU 204 or other computing components of the vehicle 102. The OBU 204 of the vehicle 102 may communicate the decoded code back to the RSU 202. Using the code, the RSU 202 may localize the vehicle 102 at the gate 104 also verify that there is no obstruction between the vehicle 102 and the gate 104.

Thus, using one or more of these approaches, the RSU 202 executes the transaction and opens the gate 104. Moreover, the RSU 202 may become aware of the location of the vehicle 102 with respect to the gate 104 or gates 104 and may further be able to determine that it is the correct time to open the gate 104 for the waiting vehicle 102. The transaction may be executed and the proper gate 104 may be lifted to allow the vehicle 102 to proceed.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 9:
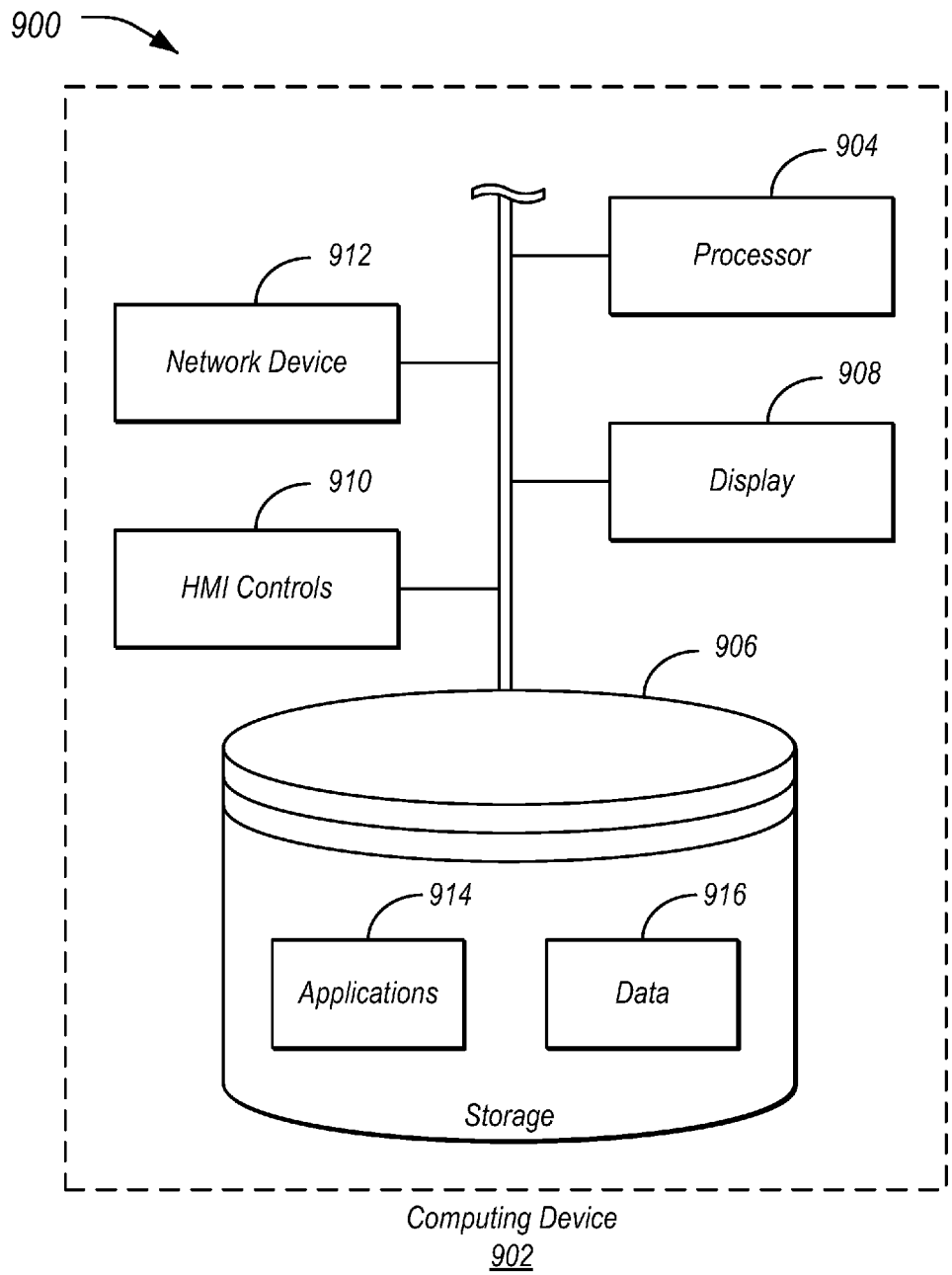
FIG. 9 illustrates an example of a computing device.

FIG. 9 illustrates an example 900 of a computing device. The computing device 902 includes a processor 904 that is operatively connected to a storage 906, a display 908, human-machine interface (HMI) controls 910, and a network device 912. The computing device 902 may store applications 914 and/or data 916 on the storage 906.

The processor 904 may include one or more integrated circuits that implement the functionality of a central processing unit (CPU) and/or graphics processing unit (GPU). In some examples, the processor 904 is a system on a chip (SoC) that integrates the functionality of the CPU and GPU. The SoC may optionally include other components such as, for example, the storage 906 and the network device 912 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 904 can include microcontrollers, application specific integrated circuits (ASICs), field programmable gate arrays (FPGAs), digital signal processors (DSPs), or any other suitable digital logic devices.

During operation, the processor 904 executes stored program instructions that are retrieved from the storage 906. The stored program instructions include software that controls the operation of the processor 904 to perform the operations described herein. The storage 906 may include both non-volatile memory and volatile memory devices. The non-volatile memory includes solid-state memories, such as NAND flash memory, magnetic and optical storage media, or any other suitable data storage device that retains data when the computing device 902 is deactivated or loses electrical power. The volatile memory includes static and dynamic random-access memory (RAM) that stores program instructions and data during operation of the computing device 902.

The GPU may include hardware and software for display of at least two-dimensional (2D) and optionally three-dimensional (3D) graphics to a display device 908. The display device 908 may include an electronic display screen, projector, printer, or any other suitable device that reproduces a graphical display. In some examples, the processor 904 executes software programs using the hardware functionality in the GPU to accelerate the performance of machine learning or other computing operations described herein.

The HMI controls 910 may include any of various devices that enable the computing device 902 to receive control input from users. Examples of suitable input devices that receive human interface inputs may include keyboards, mice, trackballs, touchscreens, voice input devices, graphics tablets, and the like.

The network device 912 may include any of various devices that enable the computing device 902 to send and/or receive data from external devices. Examples of suitable network devices 902 include a network adapter, DSRC transceiver, Wi-Fi transceiver, C-V2X transceiver, BLUETOOTH transceiver, or a peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for vehicle gated entry management, comprising:
   a roadside unit, in control of a gate protecting a gated area, the roadside unit programmed to
   receive a request, from an onboard unit of a vehicle, for access rights to the gated area,
   responsive to determining that the vehicle is authorized to enter, perform vehicle localization to confirm that the vehicle has an unobstructed path to the gate, and
   responsive to confirming that the vehicle has an unobstructed path to the gate, direct the gate to open to allow the vehicle to proceed.

2. The system of claim 1, wherein the roadside unit is further programmed to perform the vehicle localization by operations comprising to:
   broadcast gate information to the onboard unit of the vehicle, the gate information including information identifying the gate, and
   receiving a selection from the vehicle confirming that the vehicle is located at the gate as identified.

3. The system of claim 1, wherein the roadside unit is further programmed to perform the vehicle localization by operations comprising to:
   send a code to the onboard unit of the vehicle,
   receive, from a light sensor of the gate, a light capture, and
   confirm that the code is encoded in light pulses of the light capture.

4. The system of claim 1, wherein the roadside unit is further programmed to perform the vehicle localization by operations comprising to:
   send a code to the onboard unit of the vehicle, to cause the vehicle to transmit the code as encoded light to a gate reflector, the gate reflector encoding a pattern representing an identifier of the gate,
   receive, from the onboard unit, a light capture of the gate reflector, and
   confirm that the code and the identifier of the gate is encoded in light capture.

5. The system of claim 1, wherein the roadside unit is further programmed to perform the vehicle localization by operations comprising to:
   send a radar request to the onboard unit of the vehicle to cause the vehicle to send a radar signal towards the gate, receive, from the onboard unit of the vehicle, a reflection profile indicative of radar data reflected off the gate, and confirm the reflection profile matches that of the gate.

6. The system of claim 1, wherein the roadside unit is further programmed to perform the vehicle localization by operations comprising to:

send a picture request to the onboard unit of the vehicle to cause the vehicle to take a picture of lane markers on one or both sides of a pathway of the vehicle to the gate, the lane markers including an embedded code unique to the gate, receive an embedded code identified from the picture responsive to the request, and confirm that the vehicle is at the gate responsive to receipt of the embedded code.

7. A vehicle configured for gated entry, comprising:

an onboard unit configured for wireless communication with a roadside unit, the onboard unit programmed to send a request, to a roadside unit in communication with a gate protecting a gated area, for access rights to the gated area, responsive to receiving an indication that the vehicle is authorized to enter the gated area, perform vehicle localization to confirm that the vehicle has an unobstructed path to the gate, and responsive to confirming that the vehicle has an unobstructed path to the gate, direct the gate to open to allow the vehicle to proceed.

8. The vehicle of claim 7, wherein the onboard unit is further programmed to perform the vehicle localization by operations comprising to:

receive gate information from the roadside unit, the gate information including information identifying the gate, and receive a selection from a human-machine interface of the vehicle confirming that the vehicle is located at the gate as identified, and responsive to the selection, send a confirmation that the vehicle is located at the gate to the roadside unit.

9. The vehicle of claim 7, wherein the onboard unit is further programmed to perform the vehicle localization by operations comprising, responsive to receipt of a code from the roadside unit, to utilize headlights of the vehicle to transmit the code as encoded light to a gate light sensor, to be received by the sensor to confirm that the vehicle has an unobstructed path to the gate.

10. The vehicle of claim 7, wherein the onboard unit is further programmed to perform the vehicle localization by operations comprising to:

responsive to receipt of a code from the roadside unit, utilize headlights of the vehicle to transmit the code as encoded light to a gate reflector, the gate reflector further encoding a pattern representing an identifier of the gate, receive, by a light sensor of the vehicle, a light capture of the gate reflector, and confirm that the code and the identifier of the gate is encoded in the light capture.

11. The vehicle of claim 7, wherein the onboard unit is further programmed to perform the vehicle localization by operations comprising to:

responsive to receipt of a radar request from the roadside unit, send a radar signal towards the gate, receive, a reflected radar signal reflected off the gate to generate a reflection profile of the gate, and confirm the reflection profile matches a reflection profile corresponding to the gate.

12. The vehicle of claim 7, wherein the onboard unit is further programmed to perform the vehicle localization by operations comprising to:

responsive to receipt of a picture request from the roadside unit, utilize one or more cameras of the vehicle to take one or more pictures of lane markers on one or both sides of a pathway of the vehicle to the gate, the lane markers including an embedded code unique to the gate, decode the embedded code, and send the code to the roadside unit to confirm that the vehicle is at the gate.

13. A method for vehicle gated entry management, comprising:

receiving a request, from an onboard unit of a vehicle to a roadside unit in control of a gate protecting a gated area, for access rights to the gated area;

responsive to determining that the vehicle is authorized to enter, performing vehicle localization to confirm that the vehicle has an unobstructed path to the gate; and responsive to confirming that the vehicle has an unobstructed path to the gate, direct the gate to open to allow the vehicle to proceed.

14. The method of claim 13, further comprising:

broadcasting gate information to the onboard unit of the vehicle, the gate information including information identifying the gate, and receiving a selection from the vehicle confirming that the vehicle is located at the gate as identified.

15. The method of claim 13, further comprising:

sending a code to the onboard unit of the vehicle, receiving, from a light sensor of the gate, a light capture, and confirming that the code is encoded in light pulses of the light capture.

16. The method of claim 13, further comprising:

sending a code to the onboard unit of the vehicle, to cause the vehicle to transmit the code as encoded light to a gate reflector, the gate reflector encoding a pattern representing an identifier of the gate, receiving, from the onboard unit, a light capture of the gate reflector, and confirming that the code and the identifier of the gate is encoded in a light capture.

17. The method of claim 13, further comprising:

sending a radar request to the onboard unit of the vehicle to cause the vehicle to send a radar signal towards the gate, receiving, from the onboard unit of the vehicle, a reflection profile indicative of radar data reflected off the gate, and confirming the reflection profile matches that of the gate.

18. The method of claim 13, further comprising:

sending a picture request to the onboard unit of the vehicle to cause the vehicle to take a picture of lane markers on one or both sides of a pathway of the vehicle to the gate, the lane markers including an embedded code unique to the gate, receiving an embedded code identified from the picture responsive to the request, and confirming that the vehicle is at the gate responsive to receipt of the embedded code.

* * * * *